3,166,398
PRE-EMERGENCE CONTROL OF PLANT GROWTH
Bryant L. Walworth, Pennington, and Albert W. Lutz and Kathryn Wood, Princeton, N.J., assignors to American Cyanamid Company, Stamford, Conn., a corporation of Maine
No Drawing. Filed May 31, 1962, Ser. No. 198,772
4 Claims. (Cl. 71—2.5)

The present invention relates to selective herbicides. More particularly, it relates to selective pre-emergence herbicidal compositions. Still more particularly, the invention relates to selective pre-emergence herbicidal compositions containing as their active ingredient a bis-epoxy compound represented by the formula:

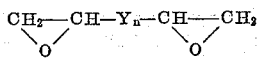

wherein Y can be a bridge linking each of the epoxy ethane molecules and can represent the grouping: $-CH_2OCH_2-$ or lower alkylene from one to four carbon atoms and $n$ is an integer from 0 to 1.

Illustrative of the bis-epoxy compounds which can be employed in the compositions of the invention are: bis-epoxyethane (i.e., 1,2,3,4-diepoxybutane); bis-(2,3-epoxypropyl) ether; bis-(epoxyethyl) methane (i.e., 1,2,3,4,5-diepoxypentane); bis-(epoxyethyl) ethane (i.e., 1,2,5,6-diepoxyhexane); bis-(epoxyethyl) 1,3-propane (i.e., 1,2,6,7-diepoxyheptane); bis-(epoxyethyl) 1,4-butane (i.e., 1,2,7,8-diepoxyoctane); homologs and isomers thereof.

The illustrative bis-epoxy compounds are known and may be prepared by any desired procedure. One such includes the method disclosed in U.S. Letters Patent No. 2,469,684, for conveniently preparing bis-(2,3-epoxypropyl) ether. Bis-epoxy ethane and bis-(epoxyethyl) alkanes are prepared by methods disclosed in Berichte, 17, at page 1092 (1884), and Jr. Chemical Society (London) at page 3131 (1950).

In general, herbicidal compositions of the present invention are prepared by admixing the active compound with an inert carrier material of the type or kind referred to in the art as pest control adjuvants in solid or liquid form. Typical carriers include the talcs, clays, pumice, silica, chalk, diatomaceous earth, walnut shell flour and equivalents thereof.

Liquid compositions may be prepared by dissolving the epoxy active compound in water, or by initially dissolving in a polar organic solvent and then admixing the resultant solution with water either with or without an emulsifying agent. Bis-epoxy compounds are quite soluble in common organic solvents, such as acetone, methyl isobutyl ketone, ethanol, dioxane and isopropyl acetate.

Emulsifying or surface-active agents which can be employed herein, are those normally employed for the preparation of oil-in-water emulsions. Illustrative of the latter are ionic and non-ionic dispersing or emulsifying agents, such as the higher alkylaryl sulfonates or polyglycol ethers which are commercially available. The emulsifying agent is generally employed in small concentrations in the range of from about 0.1% to 2% by weight of the total weight of the composition.

The compounds of the present invention may be employed either as a spray or as a dust to the area or locus to be protected from undesirable plant growth. The amount of the bis-epoxy compounds in the herbicidal compositions will, of course, vary in the manner and the purpose for which the composition is to be employed. Concentrates for subsequent use in preparing spray formulations may contain as much as 90% or more, by weight, of the active ingredient. Sprays or dusts for direct use will be relatively dilute, in some cases as low as 0.5% or less.

The invention will be further illustrated by the following examples. These are not to be taken as limitative of the invention. Unless otherwise stated, the parts are by weight.

EXAMPLE 1

To demonstrate the herbicidal activity of the compounds of the present invention, several such bis-epoxy compounds are subjected to a standardized pre-emergence test. This test demonstrates that the composition has herbicidal activity to a useful degree. It is carried out as follows:

An acetone/water solution (containing 75% water and 25% acetone, by volume) of the compound to be evaluated is sprayed and drenched on and mixed thoroughly with the top one and one-half inches of soil in duplicate glazed crocks. A sufficient quantity of solution is used equal to a dosage of twenty-five pounds of compound per acre. Seeds of wheat and radish, as representatives of monocotyledonous or narrow leaf and dicotyledonous or broad leaf plants, respectively, are planted in the treated soils. After being maintained at standard conditions of temperature and watering for a period of two weeks, the result is recorded in Table I below.

Table I

| Compound Tested | Effect on*— | |
|---|---|---|
| | Wheat | Radish |
| Bis-(2,3-epoxypropyl) Ether | 3+ | 4+ |
| Bis-epoxyethane | 5 | 5 |
| Bis-(epoxyethyl) Ethane | 5 | 5 |

*Pre-Emergence Herbicide Index:
  5=99% kill or stand reduction.
  5—=90%-99% reduction.
  4+=75%-90% reduction.
  4—=50% or less stand reduction, severe stunting.
  4=50%-75% reduction.
  3+=severe stunting, possible reduction.
  3=severe stunting, no reduction.
  2=moderate stunting (⅔ size).
  1=slight stunting.
  0+=possible stunting.
  0=no effects observed.

EXAMPLE 2

To illustrate the selective herbicidal activity of the compounds, which exhibit marked herbicidal activity on wild oats and downy brome grass as the grass weeds, an acetone/water solution comprising 75% acetone and 25% water by volume of the compound to be evaluated and 0.5 part of dodecylbenzene sodium sulfonate, based on the weight of the total composition, is sprayed and mixed with one and one-half inches of soil in duplicate crocks. A sufficient quantity of solution is employed at dosages equal to twelve and three pounds of compound per acre. Seeds of barnyard grass, millet, downy brome, wild oats, crabgrass, mustard, pig weed, radish, pusley and chickweed are planted in the treated soils. After being maintained at standard conditions of temperature and watering for four weeks, the results of this test are noted and recorded in Table II below.

*Table II*

| Compound Tested | Rate lbs./A. | Pre-Emergence Herbicide Index* | | | | | | | | | |
|---|---|---|---|---|---|---|---|---|---|---|---|
| | | B'Yard Grass | Millet | Downy Brome | Wild Oats | Crab-grass | Mustard | Pigweed | Radish | Pusley | Chick-weed |
| Bis-(2,3-Epoxypropyl) Ether | 12.0 | 5 | 5 | 5 | 5 | 5— | 5— | 5 | 5— | 4 | 0 |
| | 3.0 | 4 | 4 | 5 | 4+ | 0 | 1 | 3 | 1 | 0 | 0 |
| Bis-(Epoxyethane) | 12.0 | 4 | 1 | 4 | 5 | 1 | 1 | 2 | 0 | 0 | 0 |
| | 3.0 | 0 | 0 | 1 | 3 | 0 | 0 | 0 | 0 | 0 | 0 |

*Pre-Emergence Herbicide Index: For definitions, see Table I above.

EXAMPLE 3

To further demonstrate the selective activity of the compounds contemplated herein, the procedure of Example 2 above is followed in every detail, except that different species of plants, are employed.

This example illustrates the selectivity insofar as pre-emergence herbicidal action with respect to wild oats and downy brome grass is concerned.

The results of this test after four weeks are recorded in Table III below.

*Table III*

| Compounds Tested | Rate lbs./A. | Pre-Emergence Herbicide Index* | | | | | | | |
|---|---|---|---|---|---|---|---|---|---|
| | | Wheat | Winter Rye | Wild Oats | Downy Brome | Sudan Grass | Oats | Corn | Buck Wheat |
| Bis-(2, 3-epoxypropyl) Ether | 5 | 2 | 5 | 5 | 5 | 5 | 5 | 0 | 3 |
| | 1 | 0 | 0 | 0 | 4+ | 0 | 0 | 0 | 0 |
| Bis-epoxyethane | 5 | 2 | 5 | 5 | 2 | 4 | 5 | 2— | 5 |
| | 1 | 0 | 0 | 0 | 0 | 0 | 0 | 0 | 0 |
| Bis-(epoxyethyl) Ethane | 5 | 2 | 5 | 5 | 5— | 5 | 5 | 0 | 5— |
| | 1 | 0 | 0 | 0 | 0 | 0 | 0 | 0 | 0 |

*Pre-emergence Herbicide Index: For definitions, see Table I above.

Bis-epoxy compounds of the present invention can be admixed advantageously with other active ingredients, such as for instance, fungicides, insecticides, fertilizers and hormones to produce multi-purpose formulations. The latter may be either in the form of a powder or liquid.

We claim:

1. A method for the control of undesirable plant growth which comprises: applying to an area to be protected from such growth a bis-epoxy compound represented by the formula:

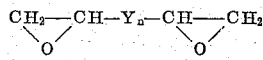

wherein Y is a divalent radical selected from the group consisting of —$CH_2OCH_2$— and lower alkylene from one to four carbon atoms and $n$ is an integer from 0 to 1, in an amount sufficient to effect herbicidal action.

2. A method for the control of undesirable plant growth which comprises: applying to an area to be protected from such growth bis(-2,3-epoxypropyl) ether in an amount sufficient to effect herbicidal action.

3. A method for the control of undesirable plant growth which comprises: applying to an area to be protected from such growth bis-(epoxyethane) in an amount sufficient to effect herbicidal action.

4. A method for the control of undesirable plant growth which comprises: applying to an area to be protected from such growth bis-(epoxyethyl) ethane in an amount sufficient to effect herbicidal action.

References Cited in the file of this patent

UNITED STATES PATENTS

| 2,469,684 | Dudley | May 10, 1949 |
| 2,986,569 | Monroe et al. | May 30, 1961 |
| 2,986,570 | Monroe et al. | May 30, 1961 |
| 2,993,058 | Hudson | July 18, 1961 |
| 2,996,551 | Groote | Aug. 15, 1961 |